(12) United States Patent
Hansen et al.

(10) Patent No.: US 6,370,362 B1
(45) Date of Patent: Apr. 9, 2002

(54) SLIDE COVER FOR A COMMUNICATION UNIT

(75) Inventors: Lars Stecher Hansen, Frederiksberg; Morten Saxbøl, Dragør; Nikolaj Bestle, København; Christian Kraft, København; Jacob Hansen, Vordingborg; Eugeniusz Zachariusz Koleda, Herlev, all of (DK)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/259,102

(22) Filed: Feb. 26, 1999

(30) Foreign Application Priority Data

Feb. 27, 1998 (GB) .............................................. 9804279

(51) Int. Cl.⁷ ................................................. H04B 1/38
(52) U.S. Cl. ........................ 455/90; 455/550; 455/575; 379/433.12
(58) Field of Search .................. 455/90, 550, 575, 455/566; 379/422, 1, 426, 428, 433–434, 440

(56) References Cited

U.S. PATENT DOCUMENTS

| | | | |
|---|---|---|---|
| 4,845,772 A | | 7/1989 | Metroka et al. .............. 379/61 |
| 5,151,946 A | * | 9/1992 | Martensson ................. 455/550 |
| 5,369,788 A | * | 11/1994 | Nagai ......................... 455/90 |
| 5,450,619 A | * | 9/1995 | Maeda ....................... 455/566 |
| 5,461,672 A | | 10/1995 | Enokido et al. ............. 379/433 |
| 5,657,370 A | | 8/1997 | Tsugane et al. ............. 455/550 |
| 5,748,454 A | * | 5/1998 | Nichols et al. ............. 361/814 |
| 5,896,277 A | * | 4/1999 | Leon .......................... 361/814 |
| 5,956,398 A | * | 9/1999 | Weadon et al. ............. 379/433 |
| 5,956,625 A | * | 9/1999 | Hansen et al. ............... 455/90 |
| 5,999,822 A | * | 12/1999 | Wicks et al. ................ 455/550 |
| 6,002,945 A | * | 12/1999 | McDuffee ................... 455/556 |
| 6,009,338 A | * | 12/1999 | Iwata et al. ................. 455/575 |
| 6,028,556 A | * | 2/2000 | Shiraki ....................... 343/702 |
| 6,073,027 A | * | 6/2000 | Norman et al. ............. 455/550 |
| 6,091,972 A | * | 7/2000 | Ogasawara ................. 455/575 |
| 6,128,475 A | * | 10/2000 | Wicks et al. ................. 455/90 |
| 6,151,485 A | * | 11/2000 | Crisp .......................... 455/90 |

FOREIGN PATENT DOCUMENTS

| | | |
|---|---|---|
| DE | 38 36 406 | 5/1990 |
| DE | 42 02 383 | 8/1993 |
| EP | 0 389 676 A2 | 10/1990 |
| EP | 0 763 904 A1 | 3/1997 |
| GB | 2 235 606 A | 9/1991 |
| WO | WO 92/09163 | 5/1992 |
| WO | WO 94/13088 | 6/1994 |

OTHER PUBLICATIONS

International Design Bulletin DM/039 951.
International Design Bulletin DM/039 675.

* cited by examiner

*Primary Examiner*—Dwayne Bost
*Assistant Examiner*—Charles Craver
(74) *Attorney, Agent, or Firm*—Perman & Green, LLP

(57) ABSTRACT

A communication unit has a housing part provided with means for entering information, and a slide assembly. The housing part is provided with a set of tracks along which the slide assembly is slidable relatively to the housing part. The slide assembly includes a cover part and a set of sliding rails extending from said cover part in the sliding direction for being received in said set of tracks on the housing part.

23 Claims, 7 Drawing Sheets

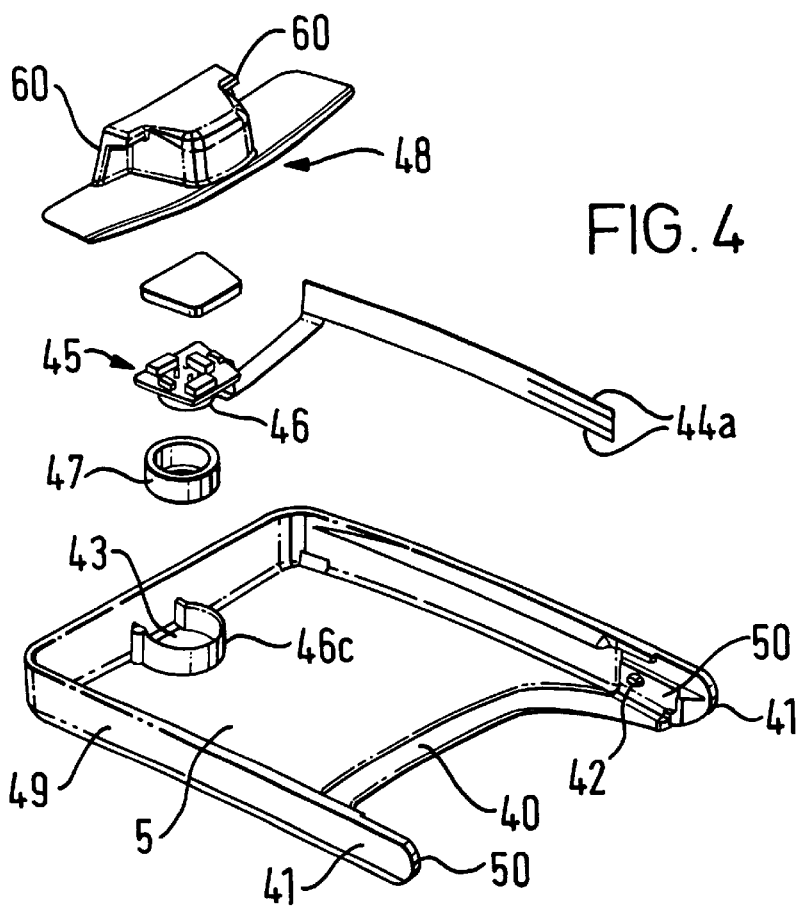
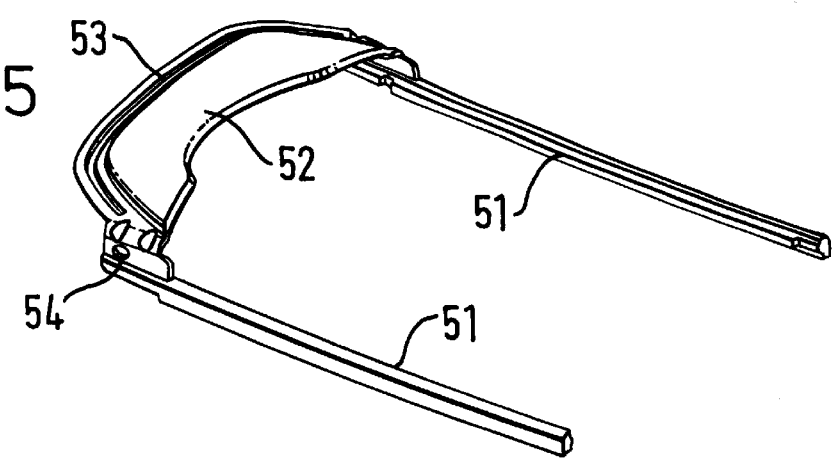

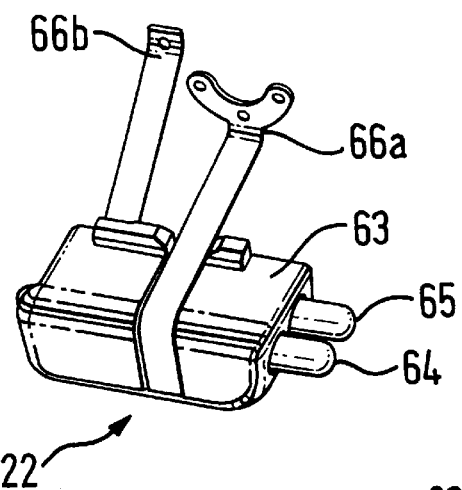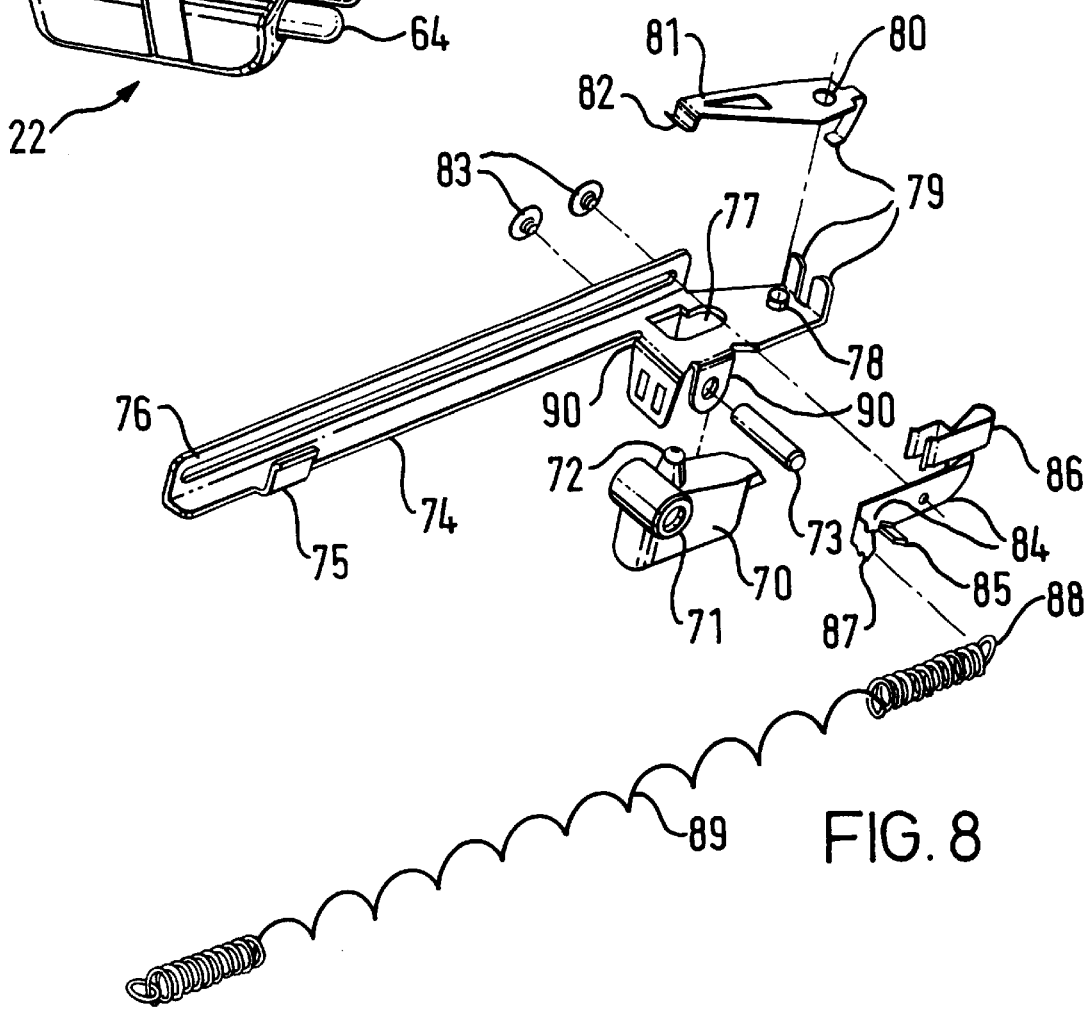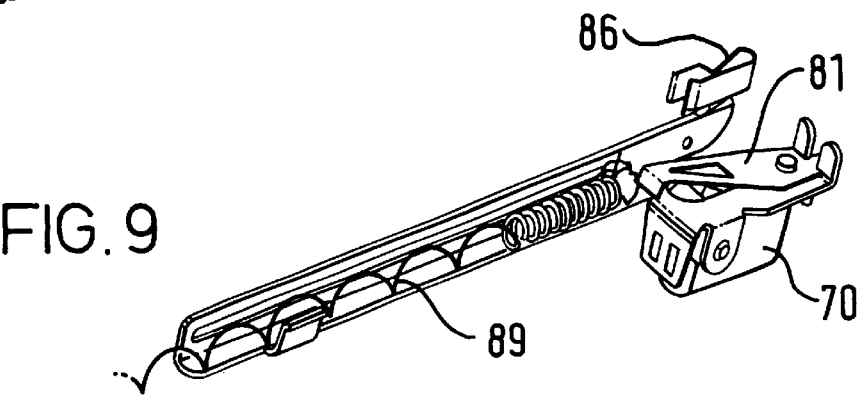

SLIDE COVER FOR A COMMUNICATION UNIT

BACKGROUND OF THE INVENTION

The invention relates to a communication unit having a housing part provided with means for entering information, and a slide cover slidable relatively to the housing part. In one position the slide cover will at least partly cover the means for entering information, while said means are freely accessible in another position of the slide cover.

Both slidable covers and pivotal flips are widely used to protect the keypad against unintended use and against dirt from the surroundings.

U.S. Pat. No. 4,845,772 describes a phone having a pivotal flip that enables the keys when the flip is closed. GB 2,235,606 discloses a phone having a slide cover carrying a microphone. International design bulletins DM/039951 and DM/039675 show two phones having detachable slides.

SUMMARY OF THE INVENTION

In accordance with the invention there is provided a communication unit having a housing part provided with a set of tracks along which a slide assembly is slidable relatively to the housing part, and said slide assembly includes a cover part and a set of rod-shaped sliding rails extending from said cover part in the sliding direction for being received in said set of tracks on the housing part. It is hereby ensured that a substantial part of the slide rail will remain in the track even when the slide is fully extended. This makes it easier to control the force required to move the slide. According to a preferred embodiment, the sliding rails will be slightly curved and substantially the entire length of the rails will be received in the corresponding tracks on the main body of the communication unit. According to a preferred embodiment, the track on the outer side of the main body of the communication unit terminates in channels continuing in tracks internally in the main body of the communication unit.

The invention provides a communication unit having a slide cover which, in an open position of the slide, allows improved access to the information input means and still provides a good mechanical connection between the slide and the main body of the unit.

Preferably, the slide assembly comprises the cover part which at least partly covers said means for entering information in one position of said slide assembly, and a slide part carrying said set of sliding rails. These two parts may be provided as an injection moulded plastics item, and as a punched and/or bent sheet metal item, respectively. By using the inherent resilient properties of the items, these parts may advantageously be snapped together.

According to a preferred embodiment, the connection to the microphone is established by providing a set of conducting paths on a wall of the cover part of the slide assembly facing the housing in continuation of one of the sliding rails. Resilient connector legs extending through the housing wall engage respective paths for connecting the microphone with an electric circuit inside the communication unit.

The resilient connector legs are integrated in a connector comprising a carrier structure carrying a set of telescopic legs. The carrier structure is used for fixing the connector relatively to the housing of the communication unit. Each of the telescopic legs comprises a tip part biased to an extended position by biasing means, e.g. formed as springs internally in the legs. A reliable connection with said set of conducting paths for the microphone is obtain hereby.

Due to the uniform force required to move the slide, the communication unit, according the preferred embodiment, may furthermore comprise a slide release mechanism including a biased mechanism for moving the slide assembly to a position in which the means for entering information are accessible, and a release mechanism for activating said biased mechanism. The biased mechanism co-operates with at least one of said set of sliding rails extending from said cover part.

According to a preferred embodiment, the slide release mechanism includes a guide profile along which said at least one sliding rail is movable, a traveller fixed to said at least one sliding rail and guided by the guide profile, means for biasing the traveller in a position in which the cover part at least partly covers said means for entering information, and locking means for locking the traveller in this position. The locking means includes a push button pivotally attached to one end of the guide profile and extending through the housing wall, a resilient latch spring fixed to the same end of the guide profile and engaging the traveller, and said push button is provided with a pin acting on the resilient latch spring for releasing the traveller when the push button is pressed. The biasing means includes a coil spring aligned with said at least one sliding rail and having one end attached to the traveller and the other end attached to the housing of the communication unit.

According to a preferred embodiment of the invention, the communication unit includes means for disabling the information entering means, e.g. disabling the key of a keypad. The disabling means includes a key for confirming an activity suggested in a display of the communication unit. When the communication unit detects that the slide has been moved to a closed position, the disabling means suggests disabling the means for entering information. The means for entering information are disabled if the user confirms the suggestion by pressing the key. According to the preferred embodiment, the key is a soft key and the functionality of the soft key will change to an idle mode functionality after a time-out period when the action has not been accepted.

The invention furthermore relates to a front cover for a communication unit, said front cover including a housing part through which means for entering information may be accessed, and a slide assembly. The housing part is provided with a set of tracks along which the slide assembly is slidable relatively to the housing part. The slide assembly includes a cover part, and a set of rod-shaped sliding rails extends from said cover part in the sliding direction for being received in said set of tracks on the housing part.

The invention furthermore relates to a slide assembly for mounting on a housing part provided with means for entering information, said slide assembly being movable along a set of tracks on the housing part, wherein the slide assembly includes a cover part and a set of rod-shaped sliding rails extending from said cover part in the sliding direction for being received in said set of tracks on the housing part.

Furthermore a microphone connector according to the invention comprises a carrier structure carrying a set of telescopic legs, each of these comprising a tip part biased to an extended position by biasing means associated with the respective telescopic legs.

BRIEF DESCRIPTION OF THE DRAWINGS

FIG. 4 is an exploded view of a slide cover for the communication unit shown in FIG. 1.

FIG. 5 is a perspective view of a slide part for the communication unit shown in FIG. 1.

FIG. 6 is a perspective and enlarged view of a slide sensor switch for the communication unit shown in FIG. 1.

FIG. 7 is a perspective and enlarged view of a microphone connector for the communication unit shown in FIG. 1.

FIG. 8 is an exploded view of a slide release mechanism for the communication unit shown in FIG. 1.

FIG. 9 is a perspective view of a slide release mechanism shown in FIG. 8.

DETAILED DESCRIPTION OF THE INVENTION

Figure 1:
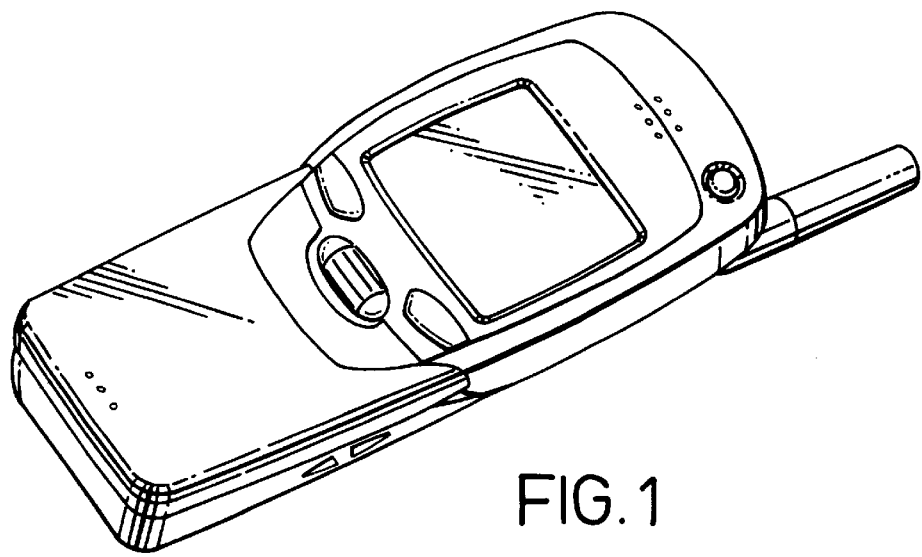
FIG. 1 is a perspective view of a preferred embodiment of the communication unit according to the invention.
Figure 2:
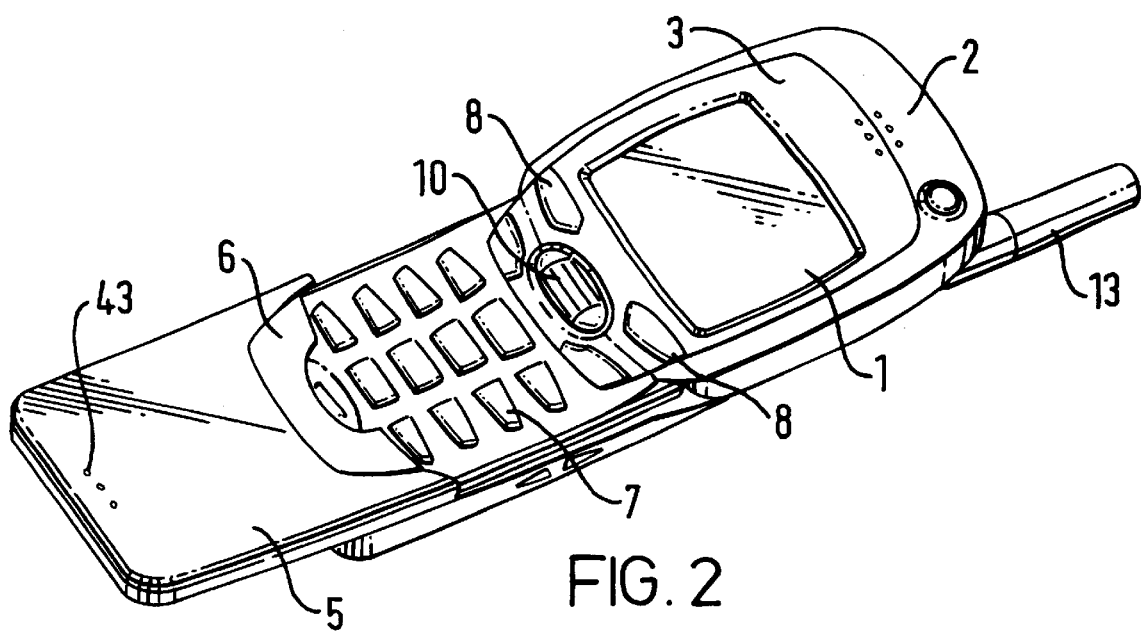
FIG. 2 is a view of the communication unit shown in FIG. 1 with the slide in open position.

A communication unit in accordance with the invention will be described in a first aspect with reference to a hand portable phone, preferably a cellular phone. A preferred embodiment of this phone is shown in FIGS. 1 and 2. The phone is shown with the slide in closed and open positions in FIGS. 1 and 2, respectively. As will be seen, the phone is provided with a front cover 2 having a window frame 3 encircling the protection window of the display assembly 1. It will furthermore be seen how the phone is provided with a slide cover 5 snapped onto a metal slide frame 6 sliding in slide tracks 75 (see FIG. 3) in the front cover 2 along a keypad area and in extension thereof.

Figure 3:
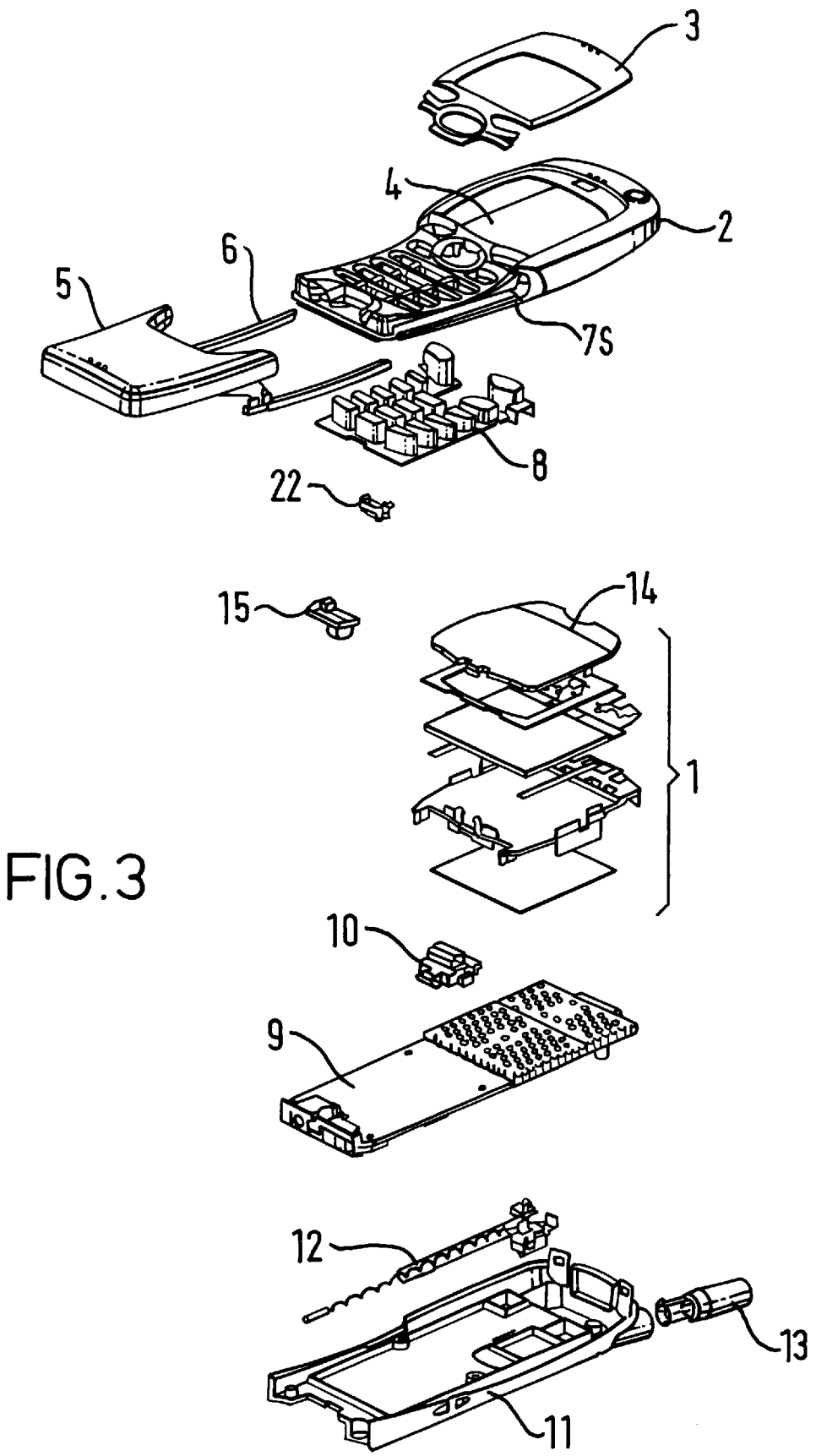
FIG. 3 is an exploded and reduced view of the essential parts of the communication unit shown in FIG. 1.

As will be seen from FIG. 3, the front cover 2 is provided with a plurality of openings, the largest one being an opening 4 in which the protection window 14 of the display assembly 1 is received. In the keypad area the front cover 2 is provided with sixteen openings through which the keys of a keypad 8 extend. A navigation key assembly 10 extends partly through the front cover 2 between the other keys and the display.

As will be seen from FIG. 2, the keypad 8, the navigation key assembly 10 and the display assembly 1 rest on and are electrically connected to a printed circuit board (PCB) 9 of the phone. A slide sensor switch 15 shown on an enlarged scale in FIG. 6 is mounted in the bottom of the PCB 9. The microphone assembly mounted in the slide cover 5 has a pin that passes through an opening in the front cover 2 and closes the switch 14 when the slide is in closed position.

An antenna 13 is mounted in the top corner of a back cover 11 and is connected to the RF circuit on the PCB 9. A spring based/latch based slide release mechanism 12 is included along one of the side walls of the back cover 11.

The display assembly 1 forms the subject-matter of a separate UK patent application having the same filing date as the present application. This parallel patent application is hereby incorporated as a reference in the present application.

Figure 10:
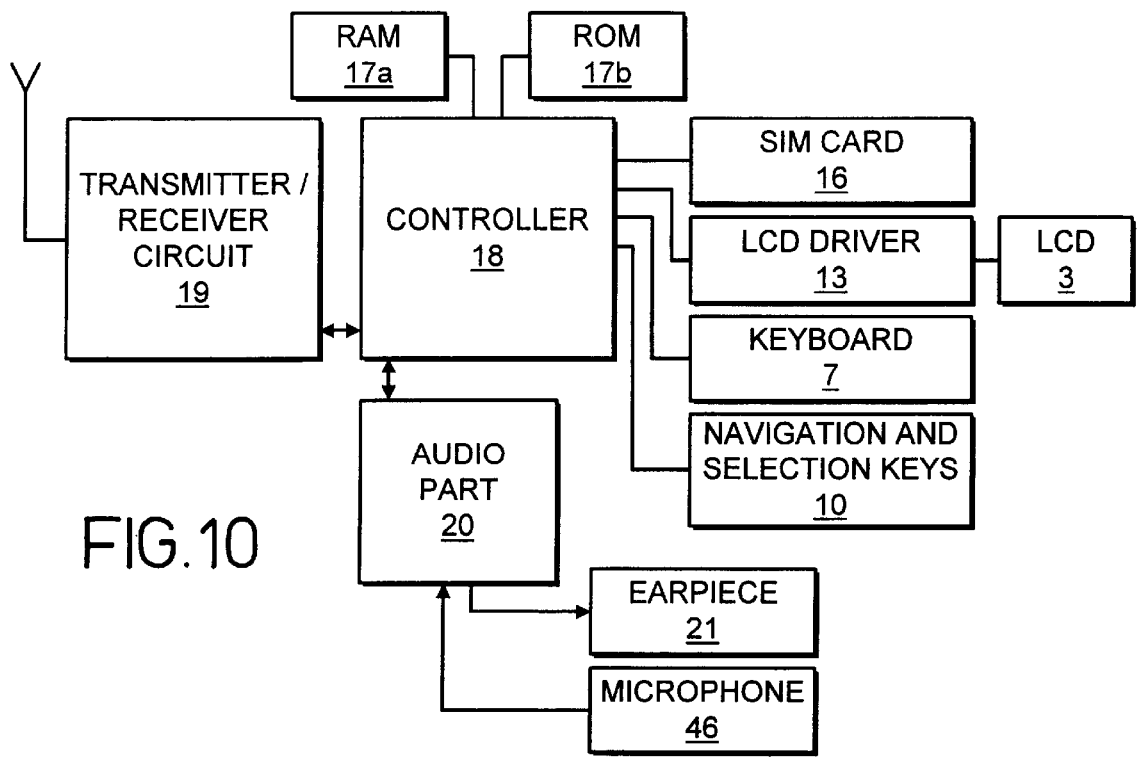
FIG. 10 is a schematic view of the essential parts of a phone for communication with a cellular or cordless network.
Figure 11:
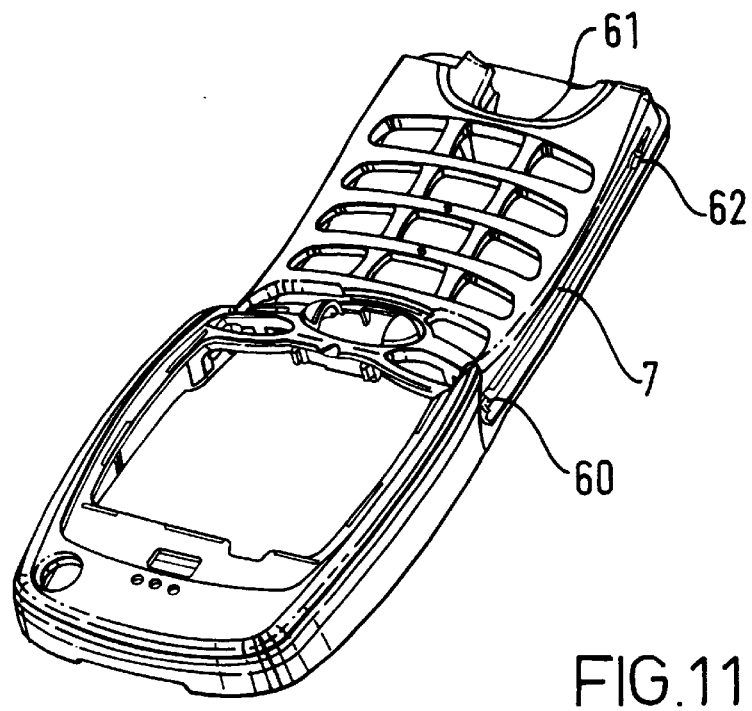
FIG. 11 is a view of the front cover of the unit shown in FIGS. 1 and 2.

FIG. 10 schematically shows the most important parts of a preferred embodiment of the phone, said parts being essential to the understanding of the invention. The preferred embodiment of the phone of the invention is adapted for use in connection with the GSM network, but, of course, the invention may also be applied in connection with other phone networks, such as cellular networks and various forms of cordless phone systems or in dual band phones accessing sets of these systems/networks. The microphone 46 records the user's speech, and the analog signals formed thereby are A/D converted in an A/D converter (not shown) before the speech is encoded in an audio part 20. The encoded speech signal is transferred to the controller 18 (physical layer processor), which e.g. supports the GSM terminal software. The controller 18 also forms the interface to the peripheral units of the apparatus, including RAM and ROM memories 17a and 17b, a SIM card 16, the display 1 and the keypad 7 (as well as data, power supply, etc.). The controller 18 communicates with the transmitter/receiver circuit 19. The audio part 20 speech-decodes the signal, which is transferred from the controller 18 to the earpiece 21 via an D/A converter (not shown).

The controller 18 is connected to the user interface. Thus, it is the controller 18 which monitors the activity in the phone and controls the display 1 in response thereto.

Therefore, it is the controller 18 which detects the occurrence of a state change event and changes the state of the phone and thus the display text. A state change event may be caused by the user when he activates the keypad including the navigation key 10, and this type of events is called entry events or user events. However, also the network in communication with the phone may cause a state change event. This type of events and other events beyond the user's control are called non user events. Non user events comprise status change during call set-up, change in battery voltage, change in antenna conditions, message on reception of SMS, etc.

The slide assembly used in the phone shown in FIGS. 1 and 2 includes the slide cover 5 (shown in detail in FIG. 4) snapped onto a metal slide frame 6 (shown in detail in FIG. 5).

As will be seen from FIG. 1, the main surface of the slide cover 5 acts as an integrated part of the housing when the slide is in closed position. The slide cover 5 carries the microphone 46 of the phone according to the invention. Therefore, a number of orifices 43 are provided in a microphone chamber 46c on the slide cover for transmitting the sound toward the microphone 46. The microphone 46 is a part of a pre-assembled microphone assembly also including a microphone flex PCB 45 with components and a flex strip 44 with two gold tracks 44a (just partly shown) serving as wires for the microphone 46. The microphone assembly is adhered to the inner surface and a side wall 49 of the slide cover 5 by an appropriate adhesive. Furthermore the microphone 46 is received in a rubber microphone gasket 47 absorbing the noise and the vibrations propagating in the slide cover 5. A protection cap 48 covers and protects the microphone 46 and the PCB 45 against external influences. The protection cap 48 is provided with two hooks 60 co-operating with the slide sensor switch 15 via an opening in the bottom of the front cover 2.

The slide cover 5 is provided with side walls 49 around three sides fitting with the housing of the phone with the slide in closed position. Opposite to the microphone the slide cover 5 is provided with a recess or a depression 40 and with lug-shaped extensions 41 of the side walls 49. The inner side of these lug-shaped extensions 41 is provided with tracks or recesses 50 having respective locking pins 42. The resilient properties of the lugs 41 and the guiding and locking properties of the recesses 50, pins 52 and depression 40 provide a snap coupling between the slide cover 5 and the metal slide frame 6.

The metal slide frame 6 is shown in FIG. 5. A carrier part is formed by punching and forming sheet metal and includes a cover part 52, a lip 53 received in the depression 40 supporting the slide cover 5 and two uprights 54 with apertures receiving the pins 52 when assembled. The uprights 54 are received in the recesses 50. The two plungers or rails 51 are formed by extrusion, cut and bent before being placed in an assembly jig. Here, the rails 51 are joined with the uprights 54 by laser welding.

FIG. 6 shows a preferred embodiment of a slide sensor switch 15 which is positioned between the PCB 9 and the front cover 2 opposite to the antenna 13. A plastics body 55 provides the mechanical strength of the switch 15 and has fingers 58 holding the two conductors 56 and 57 of the switch 15. The conductors 56 and 57 are formed by punching and forming sheet metal to conform to the shape of the body 55, and both conductors are provided with a resilient spring parts 56a and 57a which, via loops, are terminated adjacent to each other. When the hook 60 of the microphone cap 48 is moved relatively to the switch 15, as shown by the arrow F, when closing the slide, the switch constituted by the conductors 56 and 57 will be opened. The switch is closed (carrying a small current) with the slide in open position. This will be recognised by the controller 18, and the controller 18 may then control the Ul in dependence on the slide position. Calls may be answered and terminated by opening and closing the slide. The functionality of the soft keys 8 and the navigation key 10 will also be changed by opening and closing the slide. The slide switch is adapted to deem the slide closed in the one end position and in a position up to e.g. 2 mm therefrom. In all other positions the slide will be handled as being in open position.

Figure 13:
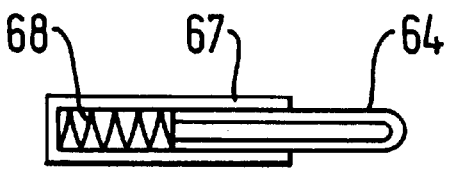
FIG. 13 is a schematic view of the structure of the resilient connector legs of the microphone connector.

FIG. 7 shows a preferred embodiment of the microphone connector 22 which is position between the PCB 9 and the back cover 11 in the bottom of the phone. The microphone connector 22 comprises a plastics body 63 supporting two telescopic legs each having first and second tube-shaped members 64 and 67, respectively. The telescopic legs are biased toward an extended position—this is shown schematically in FIG. 13. Here it will be seen how the first member 64 may travel between two extreme positions, and how a coil spring 68 urges the member 64 toward one of said extreme position.

Figure 12A:
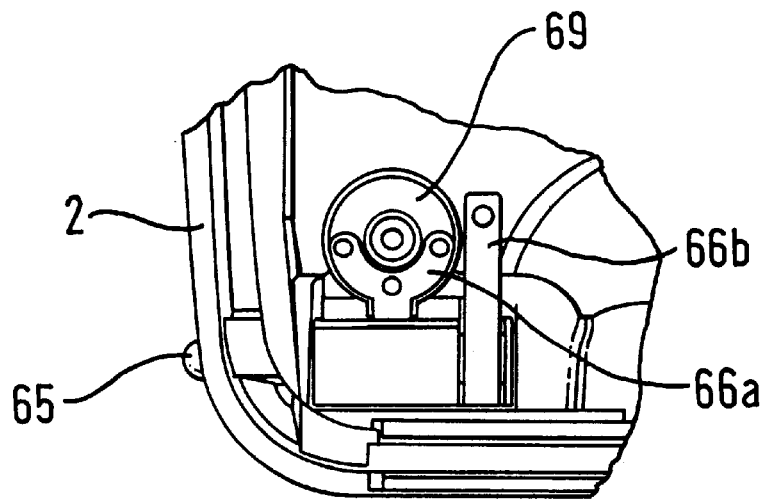
FIG. 12A is a top view of a portion of FIG. 12B.
Figure 12B:
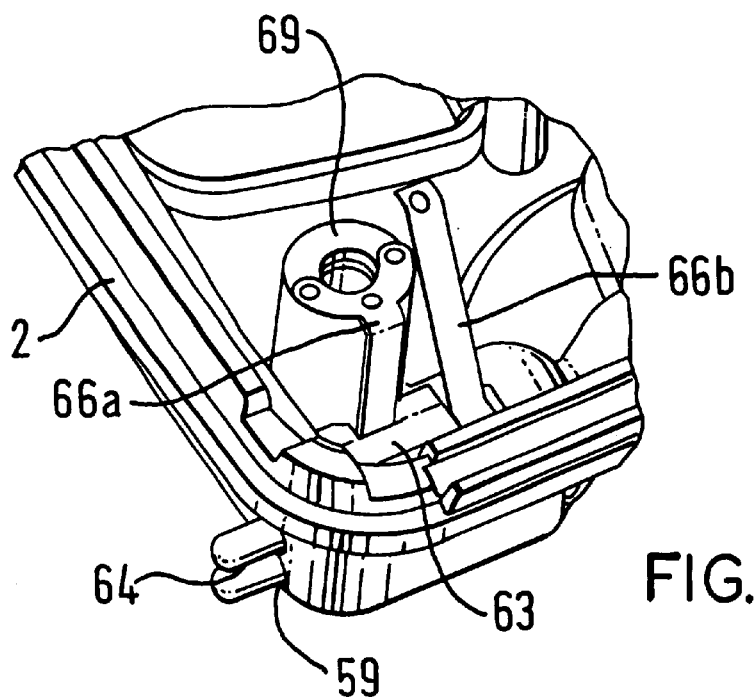
FIG. 12B is a plan/perspective and enlarged view of the position of the microphone connector shown in FIG. 7.

The first members 64 have respective tips 65 sliding against the conducting part of the flex strip 44 when the slide is moved. The two telescopic legs are connected to the PCB 9 via respective resilient connectors 66a and 66b. The position of the microphone connector 22 is kept partly by mechanical mounting in the back cover 11, partly by fixing the connector 66a between a screw tower 69 of the back cover 11 and the PCB 9. The second connector 66b just establishes the contact by means of its resilient properties. The biased members 64 pass through respective openings 59 in the back cover 11. See FIGS. 12A and 12B.

The slide release mechanism 12 is shown in detail in FIGS. 8 and 9. The slide release mechanism 12 acts as a biased mechanism for moving the slide into the open position in which the keypad 8 may be accessed. The movement of the slide is initiated by pressing a push button 70 which extends through an opening in the back cover 11 and activates a release mechanism.

The biased mechanism includes a guide profile along which a traveller fixed to one of the sliding rails on the slide is movable. The traveller is connected to one end of a coil spring 89 acting as biasing means for the traveller when the cover is in closed position.

A resilient latch spring engages the traveller, but may be released by means of the push button 70.

As mentioned, the main body of the push button 70 extends through the wall of the back cover, and a bushing 71 having a through bore and a pin 72 is formed integrally with the push button 70. The push button 70 is pivotally fixed to the guide profile by means of a pivot joint shaft 73 passing through the bushing 71 and fixed in the cut-outs of the lugs 90. The guide profile has a carrier area from which the lugs 90 extend. The carrier area has a locking pin 78 which is received in the bore 80 of the latch spring and then expanded to keep the latch in position. The latch and the carrier area are provided with interacting tongues to avoid torsion between the parts.

The latch spring has a resilient arm 81 and a hook 82, and the pin 72 of the push button 70 acts on the arm 81 through a cut 77 in the carrier area when the button 70 has been pressed.

As mentioned above, the traveller is movable along the guide profile, and the traveller has a clamp 86 for gripping the end of one of the rails 51. The rail 51 is received laterally in the clamp 86. The traveller has two holes 84 for receiving two traveller rivets 83 through a slot 76 in the guiding profile 74. Furthermore, the traveller has a tilted beam 85 co-operating with the hook 82 of the latch spring.

When the slide is moved to closed position the hook 82 catches the beam 85, and when the push button 70 is pressed, the arm 81 is lifted, whereby the beam 85 is released. Furthermore, the traveller has a hook 87 on which one eye of a coil spring 89 is attached. The other eye 91 of the coil spring 89 is attached to a hook mounted in the back cover 11 in the bottom of the phone. Hereby, the spring 89 will be extended when the slide is closed, and energy stored in the coil spring will cause the slide to open automatically when the latch spring is released. The length of the coil spring 89 is selected so that the coil spring is still slightly biased when the slide is in open position.

The guide profile 74 has a coil support member 7S and this is part of a narrow channel which is provided along the side of the back cover 11, and in which the coil spring is contained and guided. As will be seen from FIG. 9, the rail 51 will substantially be placed in parallel with the guide profile 74. From here the rails will pass through openings in the front cover 2 at the end of the slide tracks 7S (see FIG. 3) in the front cover 2 along a keypad area.

It should be noted that the conducting paths on the strip 44 extend in continuation of and at a distance from one of the sliding rails 51.

When the controller 18 detects via the slide sensor 15 that the slide has been closed, it suggests to the user that one or more keys (preferably all of the keys) should be enabled.

Figure 14:
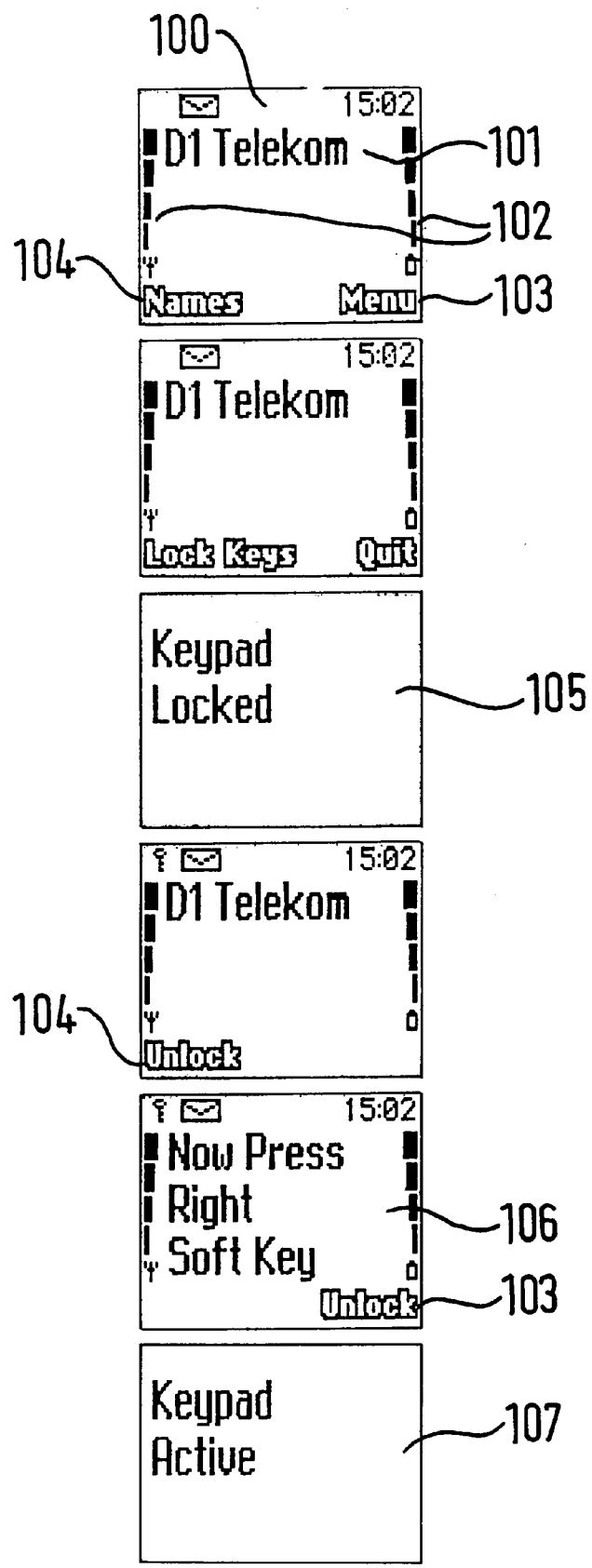
FIG. 14, in a display sequence, illustrates the intelligent key guard handling according to the invention.

This is illustrated in FIG. 14, where the first display is the idle mode display with the slide open. The top row on the display is an icon row 100 presenting some status icon. In the main area 101 of the display the name or the ID of the network operator is displayed, and two status bars 102 for the antenna strength and the battery level are displayed on each side of the main area, respectively. The current functionality of the soft keys 8 is displayed in associated parts 103 and 104 of a display. In idle mode the functionalities are access to the phone book stored in the phone and to the menu structure of the phone, respectively.

When the controller detects that the slide has been closed, the display changes to the second display, and pressing the left soft key 8 will cause the keys to be locked or enabled. If the user presses the right soft key 8 or does not do anything for more than e.g. three seconds (time-out), the display will return to the idle mode display with the keys unlocked (enabled).

However, if the user selects the suggested "Lock Keys" action, preferably all the keys including the roller key 10, the power key and the keypad will be disabled. In response to the active selection of the key lock, the third display will tell the user for a few seconds that the keypad is locked.

The user may unlock the keys in several ways. The simplest way is to open the slide. In idle mode with locked keypad and closed slide the fourth display will be shown. The left soft key 8 will have an unlock functionality 104, and in order not to unlock by mistake the pressing of the left soft key 8 will cause the fifth display to be displayed, requiring a confirmation of the unlock request by pressing of the right soft key 8, too. This has to be done within a time-out of a duration of a few seconds. If the two soft keys are pressed successively within the time-out, the keypad is unlocked, and this is indicated in the sixth display with the "Keypad Active" text for a few seconds, and the idle mode display will be shown. Otherwise, the phone will show the fourth "Unlock" display.

In view of the foregoing description it will be evident to a person skilled in the art that various modifications may be made within the scope of the invention.

The scope of the present disclosure includes any novel feature or combination of features disclosed therein either explicitly or implicitly or any generalisation thereof irrespective of whether or not it relates to the claimed invention or mitigates any or all of the problems addressed by the present invention. The applicant hereby gives notice that new claims may be formulated to such features during prosecution of this application or any such further application derived therefrom.

What is claimed is:

1. A communication unit having a housing part provided with means for entering information, and a slide assembly that is adapted to be disassembled into two parts upon being dropped to thereby avoid being damaged;

the housing part being provided with a set of tracks along which the slide assembly is slidable relative to the housing part;

the slide assembly including a first cover part which at least partly covers the means for entering information in one position of the slide assembly, and a second slide part carrying a set of rod-shaped sliding rails extending from one end of the cover part in the sliding direction for being received in the set of tracks on the housing part;

at least a part of the set of tracks being arranged inside the housing part; and a housing wall of the housing part being provided with holes aligned with the set of tracks through which the sliding rails extend.

2. A communication unit according to claim 1, wherein the cover part and the slide part are provided as two separate items snapped together.

3. A communication unit according to claim 1, wherein said cover part is provided as an injection molded plastic item, and wherein said slide part is provided as a punched sheet metal item.

4. A communication unit according to claim 1, wherein a wall of the cover part of the slide assembly facing the housing is provided with a set of conducting paths for a microphone mounted on an inner surface of the slide assembly, and said conducting paths extend in continuation of one of the sliding rails and co-operate with a microphone connector extending through the housing walls at the end of said tracks.

5. A communication unit according to claim 4, wherein a connector comprises a carrier structure carrying a set of telescopic legs, each of these comprising a tip part biased to an extended position by biasing means associated with the respective telescopic legs for establishing a reliable connection with said set of conducting paths for the microphone.

6. A communication unit according to claim 1, wherein the unit furthermore comprises a biased mechanism for moving the slide assembly to a position in which the means for entering information are accessible, and a release mechanism for activating said biased mechanism.

7. A communication unit according to claim 6, wherein the biased mechanism co-operates with at least one of said set of sliding rails extending from said cover part.

8. A communication unit according to claim 6, wherein the biased mechanism includes a guide profile along which said at least one sliding rail is movable, a traveller fixed to said at least one sliding rail and guided by the guide profile, means for biasing the traveller in a position in which the cover part at least party covers said means for entering information, and locking means for locking the traveller in this position.

9. A communication unit according to claim 8, wherein the locking means includes a push button pivotally attached to one end of the guide profile and extending through the housing wall, and a resilient latch spring fixed to the same end of the guide profile and engaging the traveller, said push button being provided with a pin acting on the resilient latch spring for releasing the traveller when the push button is pressed.

10. A communication unit according to claim 8, wherein the biasing means includes a coil spring aligned with said at least one sliding rail and having one end attached to the traveller and the other end attached to the housing of the communication unit.

11. A communication unit according to claim 1, and including means for detecting when the slide assembly is moved to a closed position in which the cover part at least partly covers said means for entering information, wherein said means for entering information includes a key for accepting an action suggested in an associated part of a display, and said suggested action is disabling of the means for entering information when the slide assembly is in closed position.

12. A communication unit according to claim 11, wherein said key is a soft key, and the functionality of the soft key changes to an idle mode functionality after a time-out period when the action has not been accepted.

13. A front cover for a communication unit, the front cover including a housing part through which means for entering information may be accessed, and a slide assembly that is adapted to be disassembled into two parts upon being dropped to thereby avoid being damaged, the housing part being provided with a set of tracks along which the slide assembly is slidable relatively to the housing part;

the slide assembly including a cover part which at least partly covers the means for entering information in one position of the slide assembly, and a slide part carrying a set of rod-shaped sliding rails extending from one end of the cover part in the sliding direction for being received in the set of tracks on the housing part;

at least a part of set of tracks being arranged inside the housing part; and a housing wall of the housing part being provided with holes aligned with the set of tracks through which sliding rails extends.

14. A front cover according to claim 13, wherein the cover part and the slide part are provided as two separate items snapped together.

15. A front cover according to claim 13, wherein the cover part is provided as an injection moulded plastics item, and wherein the slide part is provided as a punched and/or bent sheet metal item.

16. A front cover according to claim 13, wherein a wall of the cover part of the slide assembly facing the housing is provided with a set of conducting paths for a microphone mounted on an inner surface of the slide assembly, and said conducting paths extend in continuation of one of the sliding rails and co-operate with a microphone connector extending through the housing wall at the end of said tracks.

17. A slide assembly for mounting on a housing part provided with means for entering information, the slide assembly being movable along a set of tracks on the housing part and being adapted to be disassembled into two parts upon being dropped to thereby avoid being damaged, wherein the slide assembly includes a first cover part which at least partly covers the means for entering information in one position of the slide assembly, and a second slide part carrying a set of rod-shaped sliding rails extending from one end of the cover part in the sliding direction for being received in the set of tracks on the housing part.

18. A slide assembly according to claim 17, wherein the cover part and the slide part are provided as two separate items snapped together.

19. A slide assembly according to claim 18, wherein the cover part is provided as an injection moulded plastics item, and wherein the slide part is provided as a punched and/or bent sheet metal item.

20. A microphone connector for a communication unit having a housing part and a slide assembly in accordance to claim 1, said connector comprising a carrier structure carrying a set of telescopic legs, each of which comprises a tip part biased to an extended position by biasing means associated with the respective telescopic legs.

21. A microphone connector according to claim 20, wherein the set of telescopic legs are conducting, and an outer part of a tube-shaped base part of the legs is connected to respective conductive leaf springs.

22. A communication unit having a housing part provided with means for entering information;

a slide assembly; and a slide moving mechanism, the mechanism including
a biased mechanism for moving the slide assembly to a position in which the means for entering information is accessible, and
a release mechanism for activating the biased mechanism, the housing part being provided with a set of tracks along which the slide assembly is slidable relatively to the housing part, at least a part of the set of tracks being arranged inside the housing part, and the housing wall of the housing part being provided with holes aligned with the set of tracks through which the sliding rails extends for engaging with the slide moving mechanism; the slide assembly including:
a cover part which at least partly covers the means for entering information in one position of the slide assembly,
a slide part carrying a set of rod-shaped sliding rails extending from one end of the cover part in the sliding direction for being received in the set of tracks on the housing the said slide part being provided as two separate snapped together items.

23. A communication unit according to claim 1, wherein said cover part is provided as an injection molded plastic item, and wherein said slide part is provided as a bent sheet metal item.

* * * * *